United States Patent [19]

Zvanut et al.

[11] 4,214,145

[45] Jul. 22, 1980

[54] MILD STEEL, FLUX-CORED ELECTRODE FOR ARC WELDING

[75] Inventors: Albert J. Zvanut, Whittier; Michael S. Sierdzinski, Montclair, both of Calif.

[73] Assignee: Stoody Company, Industry, Calif.

[21] Appl. No.: 6,316

[22] Filed: Jan. 25, 1979

[51] Int. Cl.² .................... B23K 35/24; B23K 35/34; B23K 35/36; B23K 35/40

[52] U.S. Cl. .................... 219/145.22; 219/137 WM; 219/146.24; 219/146.30; 219/146.31; 219/146.52; 428/379

[58] Field of Search .................. 428/379; 219/145.22, 219/146.24, 146.30, 146.31, 146.52, 137 WM

[56] References Cited

U.S. PATENT DOCUMENTS

| 1,629,748 | 5/1927 | Stoody | 219/145.22 |
|---|---|---|---|
| 1,722,929 | 7/1929 | Lincoln | 428/379 |
| 3,036,205 | 5/1962 | Aida et al. | 219/145.22 |
| 3,345,495 | 10/1967 | Quaas et al. | 219/145.22 |
| 3,418,446 | 12/1968 | Claussen | 219/145.22 |
| 3,513,287 | 5/1970 | Arnoldy | 219/145.22 |
| 3,517,156 | 6/1970 | Arnoldy | 219/145.22 |
| 3,980,859 | 9/1976 | Leonard | 219/145.22 |
| 4,005,309 | 1/1977 | Zoanut | 219/145.22 |
| 4,048,705 | 9/1977 | Blanpain et al. | 219/145.22 |

*Primary Examiner*—James C. Cannon
*Attorney, Agent, or Firm*—Nilsson, Robbins, Dalgarn, Berliner, Carson & Wurst

[57] ABSTRACT

A mild steel flux-cored electrode is disclosed for use in arc welding mild and low alloy steels, which electrode complies with the specification of the American Welding Society (AWS A5.20-69) classification E70T-1. The electrode has an external diameter of 3/32" and includes a core that is contained within a mild steel sheath formed from a strip of approximately 0.012" in thickness and approximately 0.505" in width. The core constitutes approximately 45.0% of the weight of the electrode and includes as a major component iron powder having an apparent density of approximately 3 grams per cubic centimeter. The core also includes manganese and silicon in an approximate ratio of 3 to 1 respectively as in amounts: manganese 1.65% by weight and silicon 0.45% by weight.

4 Claims, 3 Drawing Figures

MILD STEEL, FLUX-CORED ELECTRODE FOR ARC WELDING

BACKGROUND AND SUMMARY OF THE INVENTION

Flux-cored electrodes are in widespread use in the field of arc welding steel where such electrodes are continuously fed to an arc for accomplishing a desired deposit on a workpiece. As such electrodes are uncoated or "bare", direct electrical contact may be made with the exterior of the electrode to provide the electrical energy that sustains the metal melting arc. In general, a flux-cored electrode includes an external sheath which encloses a core including a wide variety of fluxes, deoxidizers, and slag-forming ingredients along with alloying metal. A truly large number of different flux-cored electrodes have been proposed in the past, even when considering only mild steel electrodes for use on mild steel. However, a vast quantity of such electrode is used by industry, particularly in heavy fabrication, the manufacture and repair of construction equipment, ship building, and for offshore structures. Consequently, with regard to various criteria, a need continues to exist for an improved form of such welding electrode.

In considering any specific form of a welding electrode, the chemical composition of the resulting deposit is generally defined. Specifically, with respect to the electrode of AWS classification E70T-1, the deposited weld metal must comprise iron along with the indicated maximum percentages by weight of the following metals: manganese 1.75%, silicon 0.90%, nickel 0.30%, chromium 0.20%, molybdenum 0.30%, and vanadium 0.08%.

Apart from the requirement of the chemical composition of a standardized electrode, requirements also exist for various mechanical properties, weights, and sizes. Again with regard to the AWS classification E70T-1, various diameters may conform; however, the electrode of the present invention is restricted to a diameter of approximately 3/32" based on the establishment of a specific form of electrode which affords considerably improved performance and economy within a specific classification.

Recognizing that the weld deposit of a standard electrode classification must conform to specific requirements, the possible variations of size and content of the electrode nevertheless might approach infinity. In general, the need exists for an electrode which meets the standard of AWS classification E70T-1 and which has good weldability and mechanical properties with major improvement in efficiency or deposition rate, pounds per hour. In general, the present invention is directed to a standard AWS classification E70T-1 electrode which has a deposition rate that is substantially increased with respect to conventional electrodes that conform to the AWS classification E70T-1.

BRIEF DESCRIPTION OF THE DRAWINGS

The drawings, disclosing an illustrative embodiment of the present invention to exemplify the various advantages and objectives hereof, are as follows.

DETAILED DESCRIPTION OF THE ILLUSTRATIVE EMBODIMENT

As indicated above, a detailed illustrative embodiment of the invention is disclosed herein. However, embodiments may be constructed in accordance with various other forms, some of which may be rather different from the disclosed illustrative embodiment herein. Consequently, the specific structural and component details disclosed herein are merely representative, yet in that regard they are deemed to provide the best embodiment for purposes of disclosure and to establish a foundation as a basis for the claims herein which define the scope of the present invention.

Figure 1:
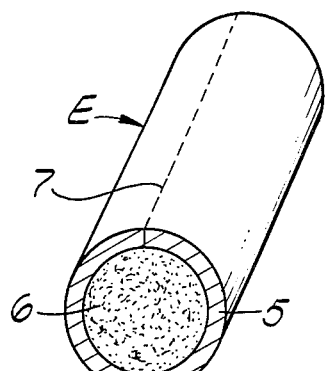
FIG. 1 is a sectionalized view through a fragment of welding electrode constructed in accordance with the present invention.

Referring initially to FIG. 1, a fragmentary length of electrode E constructed in acccordance with the present invention is illustrated in a greatly enlarged form. The electrode E incorporates a containing cover or sheath 5 which contains a core 6. Electrodes in such a form are very well known in the prior art and are referred to by such terms as fabricated, cored, or composite electrodes. Various techniques exist for manufacturing fabricated electrodes; and in that regard, various forms and shapes of enclosing sheath have been proposed. As illustrated in FIG. 1, the sheath 5 simply has an abutting-edge seam 7; however, fabricated electrodes have been proposed with various forms of seams which abut, lap, or turn. In general, the form of a seam employed is not a primary aspect of the electrode of the present invention which is otherwise specified below.

Pursuing the physical nature of the length E of electrode, it has an external diameter of substantially 3/32" which, as indicated above, comprises bare metal for electrical contact with a welding power supply.

Considering any given length of the electrode, the fill or core 6 constitutes approximately 45% of the total weight of the electrode E. The major portion of the core 6 comprises a high density atomized iron powder as described in greater detail below. In general, the use of such a powder in combination with a specific sheath 5 and critical proportions, result in a considerable improvement in the amount of wire deposited for a particular electrical current. These aspects of the electrode of the present invention are treated in greater detail below.

Figure 2:
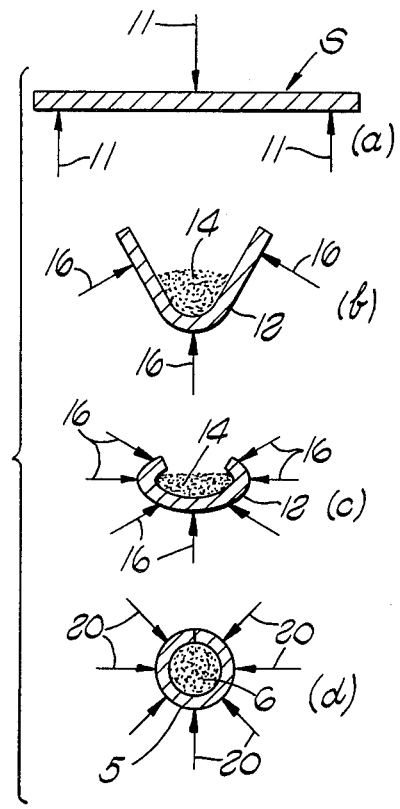
FIG. 2 is a series of sectional views illustrating the formation of the electrode of FIG. 1.

Turning now to production of the electrode E, the sheath 5 is formed of a flat strip of metal having the initial dimensions of 0.012" in thickness and 0.505" in width. Techniques for forming the sheath 5 from such a strip, with the core 6 therein, are very well known in the prior art; however, for example, the initial step in forming electrode involves developing the strip S (FIG. 2) by applying forces as indicated by the arrows 11 to provide an elongate trough 12 (FIG. 2b) utilizing any of a variety of well known techniques. After formation of the trough 12, a quantity of filler 14 (comprising the material of the core 6) is dispensed into the length of trough 12 as by a continuous feed process. Subsequently, the trough 12 is compressibly closed by the application of forces as indicated by the arrows 16 (FIGS. 2b and 2c) until the original strip is shaped into the closed strip S as illustrated in FIG. 2d. As indicated in FIG. 2d, subsequent to the formation of the tube 5, additional radial compressive forces may be applied as indicated by the arrows 20, to thereby closely compact the filler 14 to provide the core 6 (FIG. 1).

To accomplish the electrode E as illustrated in FIG. 1, the core 6 is provided to contain a major portion of high density iron powder, having an apparent density of approximately 3 grams per cubic centimeter. Repeated tests along with empirical analysis indicates that the use of such an iron powder in the electrode of the present invention is critical along with the dimensions of the strip S, the ultimate size and weight distribution of the electrode, and the presence of quantities of manganese and silicon.

The rate of deposit is an important characteristic for an electrode as disclosed herein. Specifically, the characteristic provides an indication of the pounds of metal deposited per unit of time, e.g. hour, when the electrode is supplied to an arc sustained by a predetermined electrical current. As the weight of metal deposited per unit of time in relation to a specific electrical current increases, the cost of deposition decreases because the electrical current is a manifestation of the energy required to deposit the weld metal.

Figure 3:
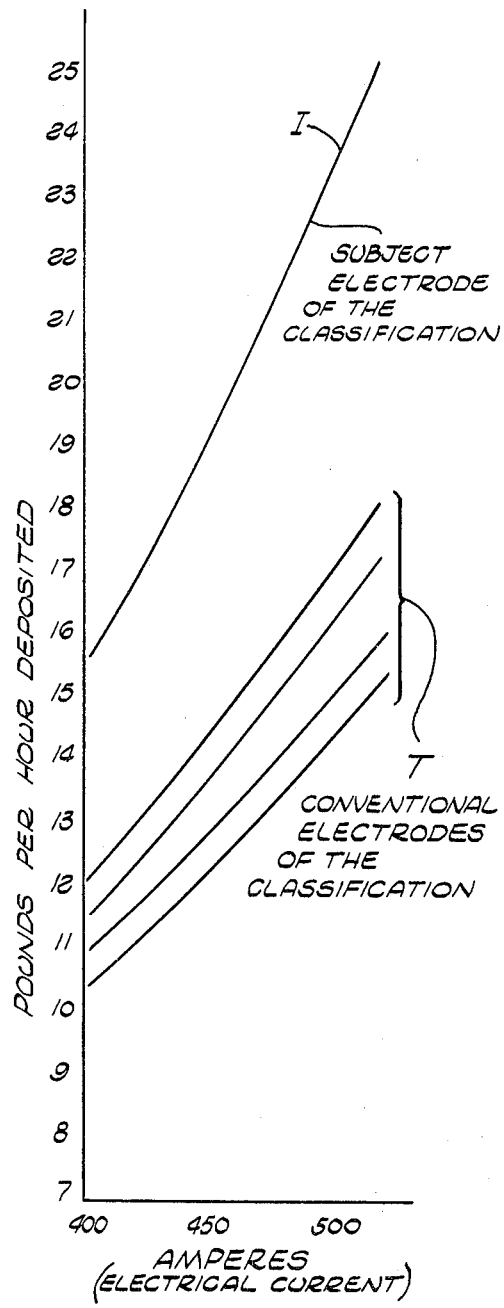
FIG. 3 is a graphic plot indicative of a characteristic of the electrode of the present invention compared with conventional electrodes of the same AWS classification.

Referring to FIG. 3, a family of curves T indicate plots of deposition rates for four well known and widely used welding electrodes which meet the AWS classification E70T-1. The electrode of the present invention is indicated by the curve I and with respect to conventional electrodes of the classification, reveals a substantially increased rate of deposition over a wide range of electrical current variation. It is to be noted, that the curve I indicates deposition rates which are substantially higher than would be the deposition rate for a solid mild steel electrode having a diameter of 3/32".

In accomplishing the improved deposition rate, it is important that the core 6 (FIG. 1) melt substantially in time coincidence with the sheath 5. Such uniformity of melting occurs in the electrode of the present invention and is a further indication of the criticality of the size relationships, dimensions, and weight distributions.

The core 6 contains other components which also are somewhat critical to the electrode of the present invention. Specifically, it has been determined that the core 6 must contain manganese metal and silicon in a ratio of approximately 3 to 1 respectively. For example, a ratio of 1.65% manganese metal and 0.54% silicon by weight of the total electrode, has been determined to be particularly effective in the core 6 for providing a weld deposit that will attain the requirements of the AWS classification E70T-1.

With the foregoing parameters in mind, an arc welding electrode was formed as described with reference to FIG. 2, utilizing the following components, in percent by weight.

| Component | Percent |
|---|---|
| strip (carbon steel) .505" × .012" | 55.0 |
| atomized iron powder (apparent density 3.15 grams/cm³) (ATW-432) | 30.7 |
| manganese metal | 1.3 |
| FeMnSi | 3.0 |
| rutile | 5.0 |
| proprietary frit (commercial quality) | 5.0 |

The wire formed was then used to deposit weld metal which was tested in accordance with the provisions of the American Welding Society specification A5.20-69 which resulted in the following complying characteristics:

| | |
|---|---|
| tensile strength (KSI) | 83.5 |
| yield strength (KSI) | 75.2 |
| percent elongation | 23.5 |
| percent reduction of area | 51.0 |
| charpy V-notch impact (foot pounds at 0° F.) | average well over 20 (40, 24, 36, 37, 36 average = 36) |

Another test was performed using the identical formulation to provide an electrode in accordance with the present invention; and the test results therefrom were as follows:

| | |
|---|---|
| tensile strength (KSI) | 81.6 |
| yield strength (KSI) | 74.7 |
| percent elongation | 25.0 |
| percent reduction of area | 58.0 |
| charpy V-notch impact (foot pounds at 0° F.) | average well over 20 (23, 23, 25, 32, 33 average = 27) |

Metal deposited from electrodes as specified above was analyzed to indicate a chemical analysis as follows:

| | Percent |
|---|---|
| carbon | 0.02 |
| manganese | 1.65 |
| silicon | 0.54 |
| phosphorus | 0.009 |
| sulfur | 0.015 |

Repeated formulations, tests, and analyses confirmed the results tabulated above. It is noteworthy that these results fall within the specification of AWS classification E70T-1 as a mild steel, flux-cored welding electrode or wire normally to be used with $CO_2$ shielding.

In addition to the above tests, deposition rates of the electrode were measured for different electrical currents. The following observations are typical, as plotted in FIG. 2 for comparison with conventional electrodes of the classification.

| Electrical Current amperes, direct current | Deposition Rate pounds per hour | Efficiency percent |
|---|---|---|
| 340 | 11.01 | 84 |
| 390 | 14.36 | 87 |
| 435 | 17.63 | 87 |
| 485 | 21.05 | 87 |
| 530 | 25.55 | 88 |

The electrode of the present invention has also been found to have desirable welding characteristics in such criteria as arc action, slag coverage, slag removal, bead shape and appearance, as well as low smoke and spatter emissions. Accordingly, the electrode of the present invention is deemed to provide an effective mild steel electrode in accordance with American Welding Society classification E70T-1, with deposition rates which are outstanding in comparison with the conventional form of such electrode classification.

In the course of commercial use or production of an electrode in accordance with the present invention, it may be that some deviation will be practical with respect to the frit, rutile, or other components. Accordingly, the present invention as set forth and defined in the claims below is recognized to involve the generalized form to the extent of the operability of the present invention. Accordingly, interpretations constructive of the scope of the present invention should be made on the basis of the claims as set forth below.

What is claimed is:

1. A mild steel, flux-cored electrode for arc welding, comprising:
    a sheath of mild steel formed from a strip having an initial thickness of approximately 0.012 inch and a width of approximately 0.505 inch, said sheath being closed to an external diameter of approximately three thirty-seconds of one inch and defining a space for containing a core; and
    a core in said sheath comprising approximately forty-five percent of the weight of said electrode for any given length, and including a major component of iron powder having an apparent density of approximately three grams per cubic centimeter, said core also including manganese and silicon in an approximate ratio of three to one respectively, whereby upon welding, said electrode will provide a deposit of mild steel consisting of iron and other components in amounts not greater than 1.7 percent manganese and 0.6 percent silicon, by weight of the deposit metal.

2. An electrode according to claim 1 wherein said core further includes minerals in percentages of approximately ten percent of the weight of said electrode.

3. An electrode according to claim 2 wherein said core includes approximately equal amounts of slag-forming frit and rutile.

4. An electrode according to claim 1 wherein said iron powder comprises atomized iron particles.